Patented Mar. 21, 1950

2,501,649

UNITED STATES PATENT OFFICE 2,501,649

BENZOTRIAZOLE COMPOUND

John B. Wright, Kalamazoo, Mich., assignor to The Upjohn Company, Kalamazoo, Mich., a corporation of Michigan No Drawing. Application February 2, 1949, Serial No. 74,240

3 Claims. (Cl. 260—308)

This invention relates to antihistaminics and is more particularly concerned with (1) 1-(beta-dimethylaminoethyl)-benzotriazole having the formula:

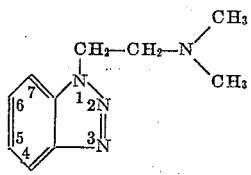

and (2) acid addition and quaternary ammonium salts thereof.

It is an object of the present invention to provide novel compounds possessing utility as therapeutics for the treatment of allergic manifestations. Another object of the present invention is to provide novel antihistaminics containing the benzotriazole nucleus. Other objects will become apparent hereinafter.

The foregoing and additional objects are accomplished by the provision of 1-(beta-dimethylaminoethyl)-benzotriazole and acid addition and quaternary ammonium salts thereof. These novel compounds have been found to exhibit a strong counteraction against histamine-induced spasm of smooth muscle tissue, thereby indicating utility as therapeutics in the treatment of allergic manifestations. The compounds are additionally useful as intermediates in the preparation of more complex organic compounds.

The free base of the present invention may be conveniently prepared by the reaction of dilute nitrous acid with ortho-amino-N-(beta-dimethylaminoethyl)-aniline at a temperature of about zero to five degrees centigrade. The acid salt of the free amine thus obtained may then be treated with an aqueous solution of an alkaline agent, e. g., sodium or potassium carbonate, sodium or potassium hydroxide, to obtain the free amine. The free amine may be isolated by extraction with ether, removal of the ether and fractional distillation.

Quaternary ammonium salts of the present invention, which are for some applications, for example, for use as therapeutic agents, even more desirable than the free base, may be prepared in conventional manner, for example, by mixing the free base with an acid, and heating in the presence of an organic solvent, in which the acid salt is insoluble, so that precipitation occurs upon formation thereof; or by merely admixing solutions of the acid and amine in stoichiometric proportions and evaporating to dryness to yield the solid salt. Representative acids which may be used are formic, acetic, citric, picric, sulfuric, hydrochloric, hydrobromic, hydriodic, phosphoric, succinic, salicylic, as well as others. Of the four nitrogen atoms present in the compound of the present invention, acid addition salts may be formed only with the nitrogen of the dimethylaminoethyl group. Other compounds which may be used to form quaternary ammonium salts are, for example, alkyl halides, aralkyl halides, and alkyl esters or arylsulfonic acids, such as for example, methyl iodide, methyl bromide, cetyl bromide, myristyl iodide, lauryl bromide, benzyl chloride, allyl bromide, ethyl (para-toluene) sulfonate, et cetera, in which case the free amine and the salt-forming agent are merely mixed together, heated to complete the reaction, and the salt thereafter isolated. The quaternary ammonium salts are, in some instances, also valuable as surface-tension depressants and wetting agents.

The free amine is a liquid boiling at 115 to 117 degrees centigrade at a pressure of 0.3 millimeter of mercury, which is soluble in water and in many common organic solvents, such as benzene, toluene, acetone, methanol, and ethanol, but is insoluble in cold aliphatic and cycloaliphatic hydrocarbons.

The following examples are given to illustrate a procedure by which the compounds of the present invention may be prepared, but they are not to be construed as limiting.

*Example 1.—Ortho-nitro-N-(dimethylaminoethyl)-aniline*

A mixture of 82.9 grams of beta-dimethylaminoethylamine, 201.9 grams of ortho-bromonitrobenzene and 200 grams of anhydrous sodium acetate was stirred and heated at a temperature of 120 to 130 degrees centigrade for eight hours. The resulting red oil was cooled, diluted with a liter of water, acidified with hydrochloric acid and steam distilled to recover 92.4 grams of unreacted ortho-bromonitrobenzene. The residue was cooled, made strongly alkaline, saturated with potassium carbonate and extracted three times with 200-milliliter portions of ether. The extracts were combined, dried over potassium carbonate, filtered, the ether removed and the resulting crude product distilled under reduced pressure. There was thus obtained 100.1 grams of ortho-nitro-N-beta-(dimethylaminoethyl)-aniline $(n_D^{25} = 1.6148)$ distilling at 125–126 degrees centigrade when the pressure is 0.2 millimeter of mercury.

*Example 2.—Ortho-amino-N - (beta - dimethylaminoethyl) -aniline*

A solution containing fifty grams of stannous chloride dihydrate in 72 milliliters of concentrated hydrochloric acid was added portionwise to a solution of 13 grams of ortho-nitro-N-(beta-dimethylaminoethyl)-aniline in fifty milliliters of concentrated hydrochloric acid which had been cooled to five degrees centigrade by means of an ice bath. The temperature of the reaction mixture rose to fifty degrees centigrade on the addition of the stannous chloride solution and was held there by intermittent cooling of the reaction flask with an ice bath. After the reaction had subsided, the reaction mixture was allowed to stand overnight at room temperature, whereafter the reaction mixture was cooled in an ice bath, made strongly alkaline with sodium hydroxide and extracted three times with fifty-milliliter portions of ether. The ether extracts were combined, dried over potassium carbonate, filtered and the solvent removed. There was thus obtained 10.9 grams of ortho-amino-N-(beta-dimethylaminoethyl)-aniline which melted between 50 and 53 degrees centigrade. After crystallization from low-boiling petroleum ether, there were obtained colorless, glistening plates which melted at 54 to 55 degrees centigrade.

*Example 3.—1-(beta-dimethylaminoethyl) -benzotriazole*

A solution of 3.1 grams of sodium nitrite in fifty milliliters of water was added dropwise with stirring to a solution of 7.52 grams of 2-amino-N-(beta-dimethylaminoethyl)-aniline in 100 milliliters of water, 14 milliliters of concentrated hydrochloric acid and 400 grams of crushed ice. The resulting dark red solution was allowed to stand for 24 hours at room temperature, made alkaline with sodium hydroxide, saturated with potassium carbonate and extracted three times with 25-milliliter portions of ether. The ether extracts were combined, dried over anhydrous potassium carbonate, concentrated and the residue distilled under reduced pressure. There was thus obtained 5.76 grams of 1-(beta-dimethylaminoethyl)-benzotriazole as a yellow-orange oil boiling between 115 and 117 degrees centigrade at a pressure of 0.3 millimeter of mercury.

1 - (beta - dimethylaminoethyl) - benzotriazole hydrochloride was prepared from the free base and ethereal hydrogen chloride. Recrystallization of the crude hydrochloride from ethanol yielded white needles melting between 170.5 and 171.5 degrees centigrade.

Various modifications may be made in the compounds of the present invention without departing from the spirit or scope thereof, and it is to be understood that I limit myself only as defined in the appended claims.

I claim:

1. A compound of the group consisting of 1-(beta-dimethylaminoethyl)-benzotriazole having the formula:

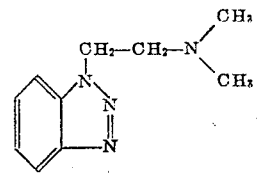

and acid addition and quaternary ammonium salts thereof.

2. 1-(beta-dimethylaminoethyl)-benzotriazole.

3. 1-(beta-dimethylaminoethyl) - benzotriazole hydrochloride.

JOHN B. WRIGHT.

No references cited.